United States Patent Office 2,711,927
Patented June 28, 1955

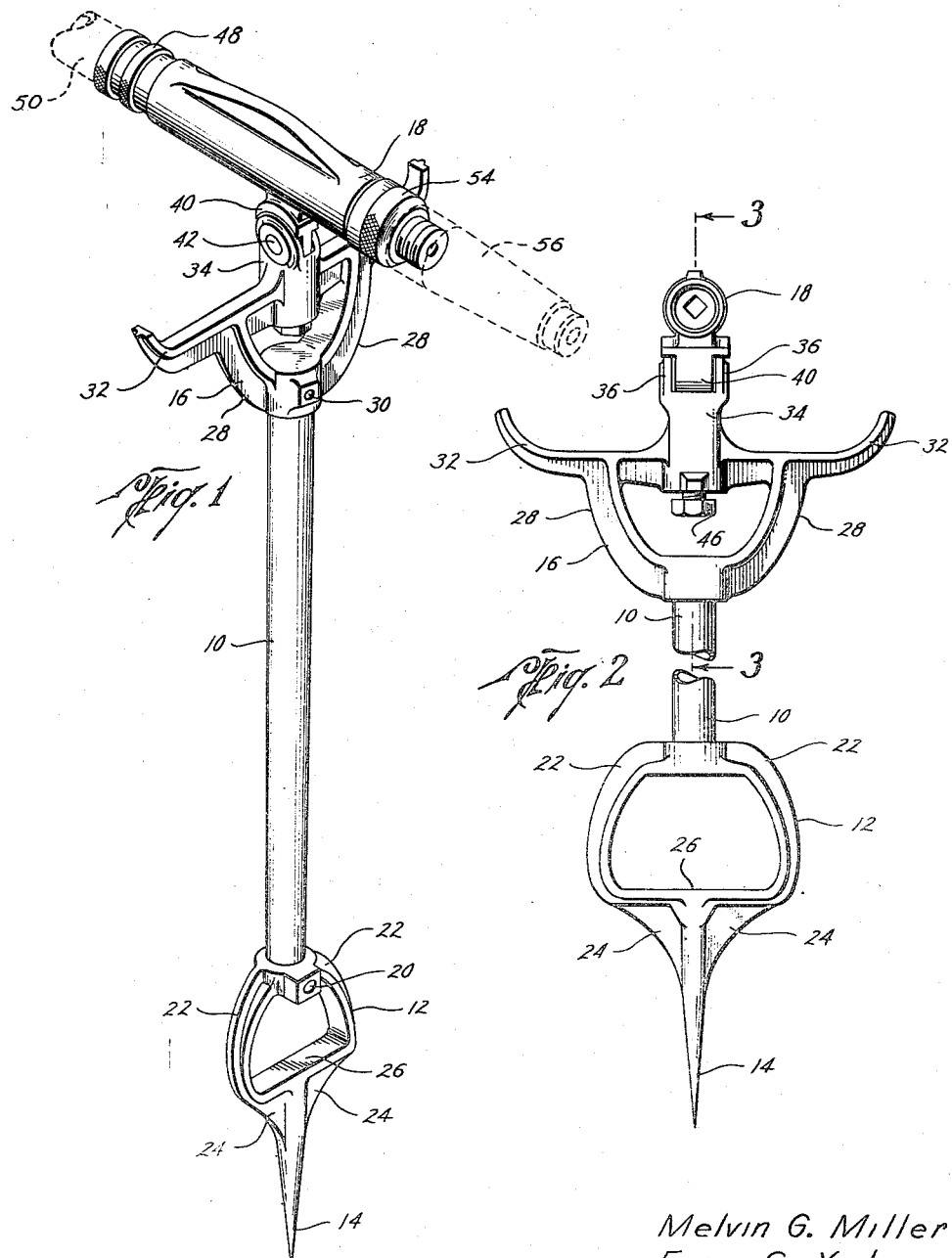

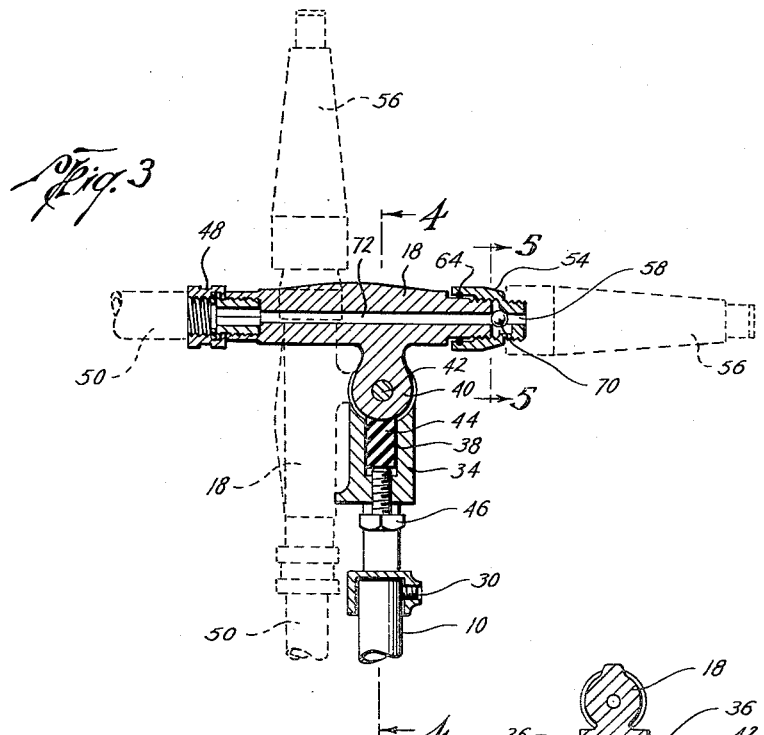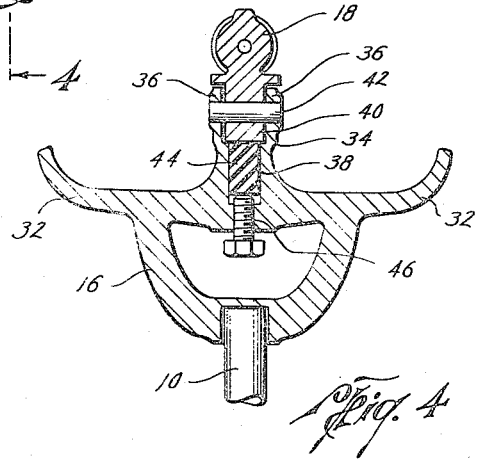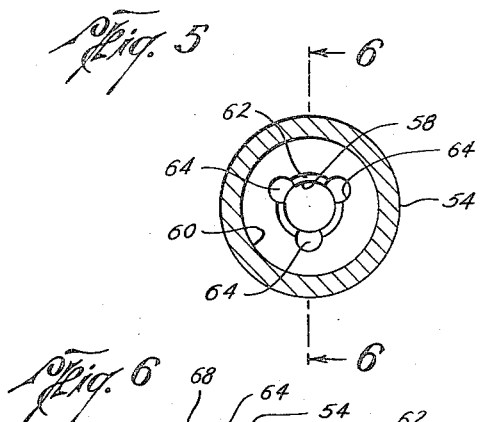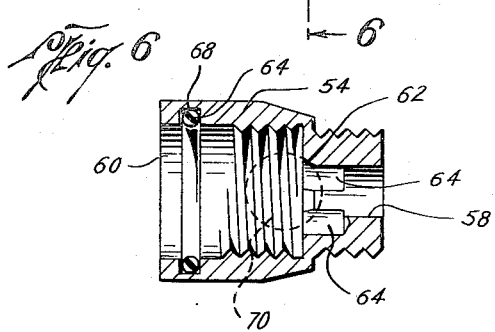

2,711,927

LAWN SPRINKLER

Melvin G. Miller and Finis G. Yates, Houston, Tex.

Application April 9, 1952, Serial No. 281,408

2 Claims. (Cl. 299—73)

This invention relates to a lawn sprinkler, and more particularly to a sprinkler structure of the type having a standard or support whose lower end is provided with a penetrating point capable of being forced into the ground to maintain the device in an upright position, and which carries at its upper end a sprinkler head adapted to be adjusted at any desired angle of inclination.

An important object of the invention is the provision of a lawn sprinkler of the type referred to having means by which pressure may be exerted by the foot of a user to press the penetrating point into the ground, so that the device may be easily positioned at any desired location.

Another object of the invention is to provide a lawn sprinkler having a standard or support provided with a ground penetrating point, and means cooperable therewith for firmly maintaining the support against movement when it has been inserted in the ground.

A further object of the invention is the provision of a lawn sprinkler of the type mentioned, having an upright standard and means thereon for supporting a hose in a coiled condition.

A further object of the invention is to provide a lawn sprinkler having an upright standard, which carries at its upper end a sprinkler head adapted to be adjusted to any desired position of inclination, and having means by which the sprinkler head is firmly held in any position of adjustment.

A still further object of the invention is to provide a lawn sprinkler having an upright standard which is formed with a stirrup like portion, adapted to receive the foot of a user, and by which pressure may be exerted to firmly insert the penetrating point into the ground.

The invention also contemplates a lawn sprinkler which is of simple design and rugged construction, capable of withstanding the rough usage and extreme conditions of exposure to which such an article is customarily subjected.

For a more complete understanding of the construction and mode of operation of the invention, reference may be had to the following detailed description, constituting a specification of the same, when taken in conjunction with the annexed drawings, wherein—

Figure 1 is a perspective view of the invention;

Figure 2 is a fragmentary front elevational view of the invention;

Figure 3 is a cross sectional view, taken along the line 3—3 of Figure 2, looking in the direction indicated by the arrows;

Figure 4 is a cross sectional view taken along the line 4—4 of Figure 3, looking in the direction indicated by the arrows;

Figure 5 is a cross sectional view, on a somewhat enlarged scale, taken along the line 5—5 of Figure 4; and Figure 6 is a cross sectional view, taken along the line 6—6 of Figure 5.

Referring now to the drawings, in greater detail, wherein like numerals of reference are employed to designate the same parts throughout the several views, the invention comprises a standard or support, which is conveniently made up of a stem 10, which carries at its lower end a foot receiving member 12, formed with a ground penetrating point 14, and at its upper end is provided with a generally yoke-shaped member 16 which supports a sprinkler head, generally indicated as 18.

The foot receiving member 12 is preferably stirrup-shaped with the penetrating point 18 extending downwardly therebeneath, and may be attached to the lower end of the stem 10 in any suitable manner, as by welding, or the use of suitable fastening means, such as a set screw indicated at 20. The foot piece 12 may be cast or otherwise formed, and may be provided with exterior reinforcing flanges, as indicated at 22. Reinforcing and ground penetrating flanges 24, may also be provided beneath the stirrup portion of the foot piece, which flanges merge with the penetrating point 14. It will be apparent that by placing the foot piece 12, in contact with the bottom 26 of the stirrup, the penetrating point 14 may be pressed into the ground to support the standard in upright position. When so positioned, it will also be apparent that the ground penetrating flanges 24 will prevent turning of the standard, and securely maintain the same against overturning in the use of the sprinkler.

The yoke-like member 16 is preferably of generally inverted stirrup-shape, having the exterior reinforcing flanges 28, and may be secured to the upper end of the stem 10 in any suitable manner, as by welding, or the provision of suitable fastening means, such as a set screw indicated at 30. Oppositely arranged laterally extending arms 32 may also be provided on the member 16, which arms are preferably upturned at their outer ends, to provide means by which a hose may be supported on the sprinkler in a coiled condition. The arms 32, also form convenient handles for lifting the sprinkler out of the ground, and for carrying the same about. The member 16 also has a centrally disposed hub portion 34, which is adapted to support the sprinkler head 18.

At its upper end the hub portion 34 is provided with spaced lugs 36, and the hub also has an axial bore formed with an internally enlarged portion 38.

The sprinkler head 18 is of generally tubular shape, and has a downwardly projecting perforated lug 40, which fits between the spaced lugs 36, of the member 16, and is pivotally secured thereto by a pivot pin 42, so that the sprinkler head may be adjusted to any desired position of inclination. Within the internal enlargement 38 of the bore of the hub 34, there is positioned a friction element 44, preferably in the form of a block of resilient material, such as rubber, an adjusting screw 46 is threadably carried by the hub, and engages at its inner end the friction member 44, and extends outwardly beyond the lower end of the hub, whereby the screw may be adjusted to bring the friction element into engagement with the lug 40 of the sprinkler head. By suitably adjusting the screw 46, the friction element 44 may be made to bear upon the lug 40, so that the head 18 will be securely held in any position to which it is adjusted but may be readily turned to any other desired position.

At its rear end the sprinkler head 18 is provided with suitable coupling means, indicated at 48, by which a hose indicated at 15 may be coupled to the sprinkler head, while at its forward end the head carries a coupling 52, for the attachment thereto of any desired type of nozzle or spraying head indicated at 56.

The coupling member 54 is illustrated in greater detail in Figures 5 and 6 of the drawing, wherein it will be seen that the same comprises a generally tubular shell, having a longitudinal discharge passageway 58 at one end, which opens outwardly at the forward end of the coupling, and which opens at its inner end into an enlarged counterbore 60. A tapered annular seat 62 is formed in the coupling at the inner end of the passageway 58, and at circumferentially spaced intervals about the seat 62 the coupling is provided with small counterbores, 64, which extend radially outwardly of the seat, and provide by-pass passageways leading from the enlarged counterbore 60 past the seat 62 into the discharge passageway 58 of the coupling. The forward end of the head 18 is externally threaded, as best seen in Figure 3 of the drawings, and the enlarged internal bore 60 of the coupling is internally threaded for attachment to the head. Suitable packing means, such as an O-ring 66, may be positioned in an internal groove 68 within the enlarged counterbore 60, which engages the exterior of the head 18, to form a fluid tight seal between the head and coupling.

Within the coupling 54, and between the seat 62 thereof and the adjacent end of the head 18, there is a ball valve 70, which is adapted to seat against the end of the head to close the passage 72 therethrough, when the coupling is screwed down into engagement with the ball, as will best be seen in Figure 3 of the drawings. In this condition of the apparatus the flow of water is cut off from the nozzle or spray head. By unscrewing the coupling 58 the ball valve 70 is released, and the pressure of the water causes the valve to move away from the end of the head, thus opening the passageway 72, and the water may then flow past the valve seat 62 through the counterbores 64 and out of the discharge passageway 58. The flow of water through the head and nozzle or spraying head may thus be controlled by adjustment of the coupling 54, while the packing 64 prevents any leakage of water from between the coupling and the head in any position of the coupling.

In assembling the head with the member 16, the screw 46 is first retracted, and the friction block 44 is inserted in the counterbore 48, by inserting the same therein between the lugs 36 and the hub 34. The lug 40 of the head is then inserted between the lugs 36, and the pin 42 inserted through the perforations of the lugs 36 and the lug 40 to pivotably secure the head on member 16. The screw 46 is then rotated to move the friction block 44 into engagement with the lug 40, to secure the desired amount of frictional resistance to turning of the head on the hub. By this means the head may be securely maintained in any position of inclination to which it is adjusted.

In making use of the invention the same is assembled in the manner described above, and a suitable nozzle or spraying head 56 is attached to the outer threaded end of the coupling 54, and a hose 50 is coupled to the opposite end of the sprinkler head by means of the coupling 48. The hose may then be coiled and suspended on the arms 32, in order that the entire device may be carried to the desired location. By inserting the foot in the stirrup member 12 in engagement with the bottom 26 thereof, the penetrating point 14 may be forced into the ground at any desired location, to maintain the standard in an upright position, with the nozzle 56 pointing in the direction in which the water is to be sprayed. Thereafter the free end of the hose 50 may be connected to any available source of water supply, and the valve 70 opened to the desired extent by the adjustment of the coupling 54, after which the head 18 may be adjusted to the desired inclination, to secure the distribution of water sprayed from the nozzle 56 at the location desired.

It will thus be seen that the invention provides a lawn sprinkler which is of simple design and strong construction, which forms a ready support for a coiled hose, and which is easily carried about, and inserted in the ground at any desired location for use.

The invention has been described in connection with a specific embodiment of the same, but it will be understood that this is intended by way of illustration only, and that numerous modifications can be made in the construction and arrangement of the various parts, without departing from the spirit of the invention, or the scope of the appended claims.

Having thus clearly shown and described the invention, what is claimed as new, and desired to secure by Letters Patent is:

1. A lawn sprinkler comprising a standard having a penetrating point at its lower end, a stirrup on the standard above said point and in position for engagement by the foot of a user to apply force to said point to cause the same to penetrate the ground, laterally extending supports on the standard above the stirrup adapted to support a hose in a coiled condition, a sprinkler head pivotally carried on said standard and adjustable thereon to any desired position of inclination, friction means movably carried by the standard for movement into frictional engagement with said head to maintain the head in any position of adjustment and adjustable means on the standard engageable with said friction means and operable to move the friction means toward the head.

2. A lawn sprinkler comprising a standard having a point at its lower end adapted to be forced into the ground to maintain the standard in upright position, a tubular hub carried by said standard, a sprinkler head, means pivotally securing said head to the hub, a friction element in the hub and movable therein into frictional engagement with said head to resist pivotal movement of the head relative to the hub, and adjustable means on the hub engageable with said friction element to move said element toward said head.

References Cited in the file of this patent

UNITED STATES PATENTS

| | | |
|---|---|---|
| D. 167,218 | Miller | July 8, 1952 |
| 352,697 | Lane | Nov. 16, 1886 |
| 1,129,197 | Howes | Feb. 23, 1915 |
| 1,249,838 | Schneider | Dec. 11, 1917 |
| 2,446,723 | Schaechterle | Aug. 10, 1948 |

FOREIGN PATENTS

| | | |
|---|---|---|
| 182,907 | Switzerland | Sept. 16, 1936 |